United States Patent [19]
Olson et al.

[11] Patent Number: 5,363,486
[45] Date of Patent: Nov. 8, 1994

[54] VARIABLE SIZE QUEUE CIRCUIT FOR BUFFERING DATA TRANSFERS FROM A PROCESSOR TO A MEMORY

[75] Inventors: Anthony M. Olson, Stevensville; Babu Rajaram, St. Joseph, both of Mich.

[73] Assignee: Zenith Data Systems Corporation, Buffalo Grove, Ill.

[21] Appl. No.: 91,462

[22] Filed: Jul. 13, 1993

Related U.S. Application Data

[63] Continuation of Ser. No. 914,038, Jul. 14, 1992, abandoned, which is a continuation of Ser. No. 435,970, Nov. 13, 1989, abandoned.

[51] Int. Cl.⁵ .................. G06F 13/00; G06F 12/00
[52] U.S. Cl. .................. 395/250; 395/425; 364/DIG. 1; 364/239; 364/239.1; 364/243.41; 364/260
[58] Field of Search .................. 395/250, 425

[56] References Cited

U.S. PATENT DOCUMENTS

| | | | |
|---|---|---|---|
| 4,040,027 | 8/1977 | Van Es et al. | 364/900 |
| 4,258,418 | 3/1981 | Heath | 364/200 |
| 4,327,411 | 4/1982 | Turner | 364/900 |
| 4,354,231 | 10/1982 | Carlsson et al. | 364/200 |
| 4,433,374 | 2/1984 | Hanson et al. | 364/200 |
| 4,451,880 | 5/1984 | Johnson et al. | 364/200 |
| 4,467,414 | 8/1984 | Akagi et al. | 364/200 |
| 4,905,184 | 2/1990 | Giridhar et al. | 364/900 |

OTHER PUBLICATIONS

"Data Management in a Circular Buffer" written by Chapman et al., IBM Tech. Discl. Bull., vol. 20, No. 8 Jan. 78, pp. 3309–3310.
"Butter System" written by Skou et al., IBM Tech. Discl. Bull., vol. 2 No. 5 Feb. 1960 pp. 86–89.

*Primary Examiner*—Eddie P. Chan
*Attorney, Agent, or Firm*—Flynn, Thiel, Boutell & Tanis

[57] ABSTRACT

A computer system includes a memory capable of storing a plurality of data words, and a central processing unit for outputting data words to be stored in the memory. A method and apparatus for facilitating transfer of the data words from the central processing unit to the memory involve accepting and temporarily storing in a storage portion each data word from the central processing unit and then subsequently storing in the memory each temporarily stored data word, the maximum number of data words which can be temporarily stored being selectively set to one of first and second values which are different.

12 Claims, 15 Drawing Sheets

| STATE | QWRP / QRDP | | | | | | | |
|---|---|---|---|---|---|---|---|---|
| | 7 | 6 | 5 | 4 | 3 | 2 | 1 | 0 |
| 1 | 0 | 0 | 0 | 0 | 0 | 0 | 0 | 0 |
| 2 | 0 | 0 | 0 | 0 | 0 | 0 | 0 | 1 |
| 3 | 0 | 0 | 0 | 0 | 0 | 0 | 1 | 1 |
| 4 | 0 | 0 | 0 | 0 | 0 | 1 | 1 | 1 |
| 5 | 0 | 0 | 0 | 0 | 1 | 1 | 1 | 1 |
| 6 | 0 | 0 | 0 | 1 | 1 | 1 | 1 | 1 |
| 7 | 0 | 0 | 1 | 1 | 1 | 1 | 1 | 1 |
| 8 | 0 | 1 | 1 | 1 | 1 | 1 | 1 | 1 |
| 9 | 1 | 1 | 1 | 1 | 1 | 1 | 1 | 1 |
| 10 | 1 | 1 | 1 | 1 | 1 | 1 | 1 | 0 |
| 11 | 1 | 1 | 1 | 1 | 1 | 1 | 0 | 0 |
| 12 | 1 | 1 | 1 | 1 | 1 | 0 | 0 | 0 |
| 13 | 1 | 1 | 1 | 1 | 0 | 0 | 0 | 0 |
| 14 | 1 | 1 | 1 | 0 | 0 | 0 | 0 | 0 |
| 15 | 1 | 1 | 0 | 0 | 0 | 0 | 0 | 0 |
| 16 | 1 | 0 | 0 | 0 | 0 | 0 | 0 | 0 |

Fig. 7

| CSSRB# | CSSRC# | CSSRE# | MODE |
|---|---|---|---|
| 1 | X | X | QUEUE OFF |
| 0 | 1 | X | 1 LEVEL QUEUE |
| 0 | 0 | 1 | 16 LEVEL QUEUE |
| 0 | 0 | 0 | EXTERNAL LEVEL CONTROL |

VARIABLE SIZE QUEUE CIRCUIT FOR BUFFERING DATA TRANSFERS FROM A PROCESSOR TO A MEMORY

This application is a continuation of U.S. Ser. No. 07/914 038 filed Jul. 14, 1992, which was a continuation of U.S. Ser. No. 07/435 970 filed Nov. 13, 1989, now both abandoned.

FIELD OF THE INVENTION

The present invention relates to a queue circuit for temporarily storing data from a high-speed central processing unit and then subsequently writing the data into a memory and, more particularly, to such a queue circuit in which the maximum number of data words which can be temporarily stored by the queue circuit can be varied.

BACKGROUND OF THE INVENTION

In conventional computer systems, the central processing unit (CPU) is usually much faster than the main memory. In order to avoid having the CPU stop and wait for the slower main memory each time it tries to write a word into the main memory, a conventional queue circuit is often provided to accept and temporarily store a word from the CPU as fast as the CPU can output the word so that the CPU does not have to stop and wait, and then the queue circuit subsequently stores the word in main memory while the CPU is carrying out other processing.

In conventional systems, the maximum number of data words which the queue circuit can accept and store is normally a fixed number. For example, there are queue circuits which can temporarily store only one data word, as a result of which the queue circuit must transfer the stored data word to the main memory before the queue circuit can accept a further data word from the CPU.

It is an object of the present invention to provide a queue circuit in which the maximum number of words the queue circuit is permitted to store when turned on can be selectively varied.

It is a further object of the invention to provide such a queue circuit which can be selectively turned off.

It is a further object of the invention to provide such a queue circuit which involves minimal additional hardware or software in comparison to conventional queue circuits, and which is thus relatively inexpensive to incorporate into a computer system.

The objects and purposes of the invention, including those set forth above, are met by providing a method and apparatus in which a predetermined maximum number of words can be accepted from a first arrangement and temporarily stored and then subsequently transferred to a second arrangement, wherein the maximum number of words can be selectively set to at least two different values which are integers greater than or equal to zero.

BRIEF DESCRIPTION OF THE DRAWINGS

A preferred embodiment of the present invention is described in detail hereinafter with reference to the accompanying drawings, in which:

FIG. 6 is a table showing an operational sequence of states effected by each of two counters respectively shown in FIGS. 3 and 4;

FIG. 7 is a table which shows respective states to which a control register for the queue circuit of FIG. 1 can be set and which correlates the states to respective operational modes of the queue circuit;

DETAILED DESCRIPTION

Figure 1:
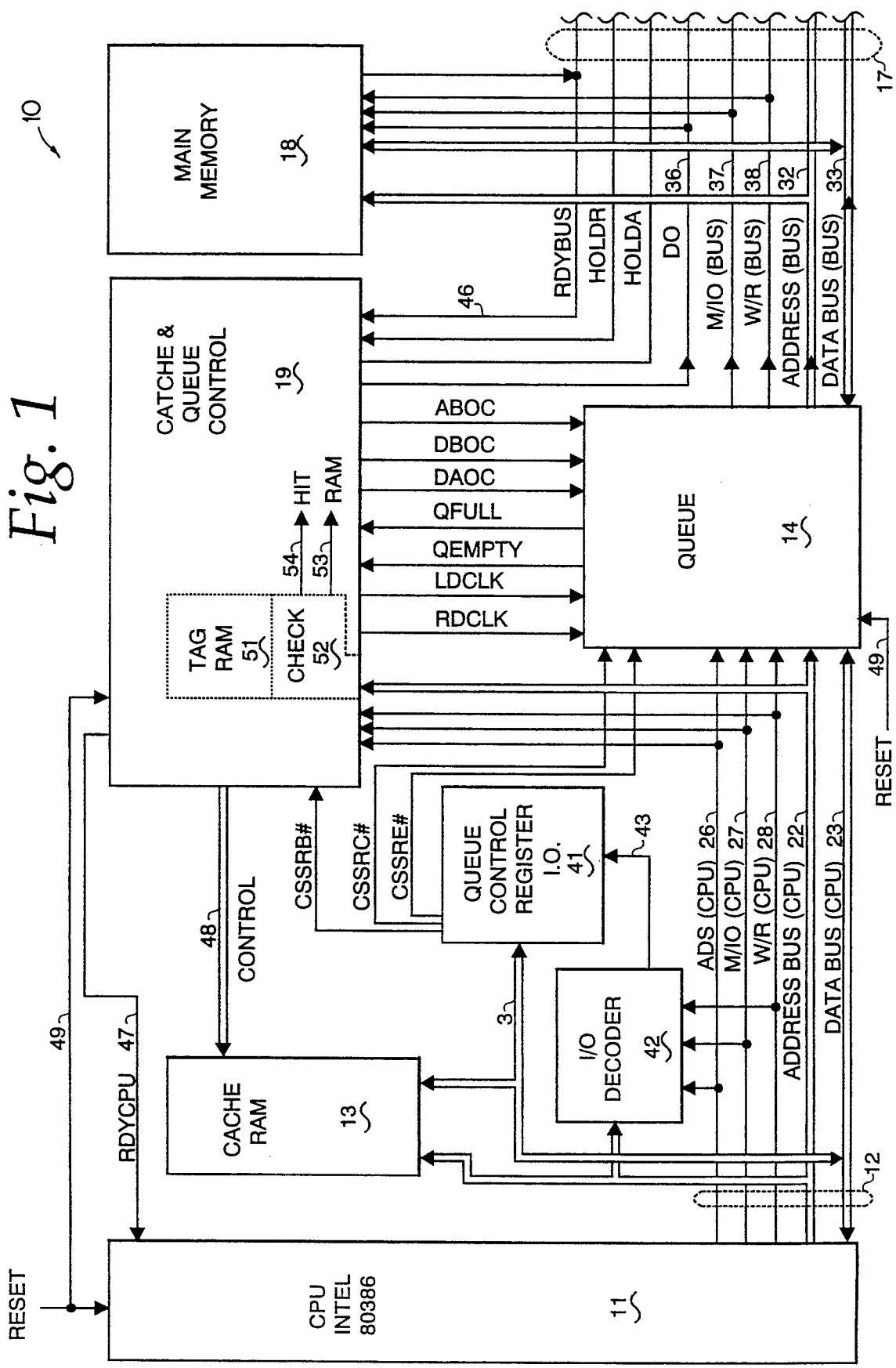
FIG. 1 is a block diagram of a computer system embodying the present invention.

FIG. 1 shows in block diagram form a computer system 10 which embodies the present invention. The computer system 10 includes a central processing unit (CPU) 11, a CPU bus 12 coupling the CPU 11 to a cache random access memory (RAM) 13 and to a queue circuit 14, and a system bus 17 coupling the queue circuit 14 to a main memory 18. The system 10 also includes a cache and queue control circuit 19, which controls the cache RAM 13 and the queue circuit 14.

In the preferred embodiment, the CPU 11 is an Intel 80386, which is a conventional and commercially available part marketed by Intel Corporation of Santa Clara, Calif. However, almost any other conventional and commercially available microprocessor could be used for the CPU 11.

The cache RAM 13 and main memory 18 are each conventional semiconductor memories. The main memory 18 is relatively large, and in the preferred embodiment is 64 MB (megabytes). Fast semiconductor memory components are significantly more expensive than slower semiconductor memory components. Therefore, in order to minimize overall system cost, the relatively large main memory 18 is made from slower semiconductor memory components. As a result, and in view of the fact that the CPU 11 is a high-speed unit, the main memory 18 cannot read and write data as fast as the CPU 11 can output and input data. The potential thus exists for the main memory 18 to significantly degrade the efficiency of the CPU 11. In particular, if the CPU 11 had to stop and sit idle while waiting for the main memory 18 each time the CPU 11 tried to read data from or write data to the main memory 18, the amount of processing accomplished by the CPU would be significantly less than it would be if the CPU 11 could run at full speed without repeated idle intervals. The cache RAM 13 and queue circuit 14 are provided to minimize the amount of time the CPU spends waiting for the main memory 18.

More specifically, the cache RAM 13 is provided to reduce the amount of time that the CPU spends waiting for the main memory 18 during reads. The cache RAM 13 is much smaller than the main memory 18, but made of semiconductor memory components which are much faster than those used in the main memory 18. In the preferred embodiment, the cache RAM is 16 KB (kilobytes). The cache RAM 13 stores a duplicate of data in certain locations in the main memory 18, for example locations in the main memory 18 which have recently been read by the CPU 11. If the CPU attempts to again read the same data from the main memory 18, the cache RAM 13 will intervene and supply the data to the CPU 11 much faster than the main memory 18, so that the CPU 11 does not waste any time in an idle interval during that read. The queue circuit 14, on the other hand, is provided to minimize the amount of time that the CPU 11 spends waiting for the main memory 18 when the CPU 11 is trying to write data into the main memory 18. In particular, the queue circuit 14 has the capability to accept a data word from the CPU 11 as fast as the CPU 11 is capable of outputting the data word so that the CPU 11 can continue at full speed with its processing without experiencing an idle interval, and while the CPU 11 is continuing with its other processing the queue circuit 14 takes over the relatively slow task of writing the data word into the main memory 18. When data is read from the main memory 18, the queue circuit 14 passes it directly through to the CPU 11 as if the queue circuit were electrically functionally transparent.

The CPU 11 outputs addresses on a 26-bit address bus 22, outputs a control signal ADS on a line 26 to indicate that a valid address is present on bus 22, outputs a control signal M/IO on a line 27 to indicate whether an address on bus 22 is for a memory device or an input-/output (I/O) device, and outputs a W/R signal on a line 28 to indicate whether data is being written to a device or read from a device. Data is transferred to and from the CPU 11 across a 32-bit bidirectional data bus 23.

The system bus 17 includes a 26-bit address bus 32, a 32-bit data bus 33, and control signals M/IO and W/R which correspond functionally to the lines 22, 23 and 27–28 of the CPU bus 12. The queue circuit 14 can control the lines 32, 33 and 37–38 in the same manner in which the corresponding lines of the CPU bus 12 are controlled by the CPU 11, essentially by outputting onto lines 32, 33 and 37–38 signals previously obtained from the corresponding lines of the CPU bus 12 and stored in the queue circuit. Thus, the main memory 18 assumes that it is receiving signals directly from the CPU 11, when in fact it is receiving them from the queue circuit 14. It is also possible for other not-illustrated devices attached to the system bus 17 to control some of these control lines for the system bus 17, as will be mentioned again later.

A queue control register 41 has three data inputs which are connected to three lines of the data bus 23, and has three outputs which are labeled CSSRB#, CSSRC#, and CSSRE#. (In this application, the symbol # following a signal name indicates that it is the complement or inverse of the signal in question). Signal CSSRB# is supplied to control circuit 19, and signals CSSRC# and CSSRE# are supplied to queue circuit 14. An I/O decode circuit 42 is connected to the address bus 22 and the control lines 26, 27 and 28. When the CPU 11 wants to load the queue control register 41, it outputs the information to be loaded into the register 41 on three lines of the data bus 23, outputs a predetermined I/O address on bus 22, and uses control lines 26–28 to specify that it is carrying out an I/O write cycle. When the I/O decode circuit 42 detects that the predetermined I/O address is present on bus 22 during an I/O write cycle, the circuit 42 produces a pulse on line 43 which causes the register 41 to be loaded from the data bus 23. Those of ordinary skill in the art are thoroughly familiar with I/O decode circuits of the type shown at 42, and the internal structure of the decode circuit 42 is therefore not disclosed here in detail.

The system bus 17 includes an RDYBUS signal on a line 46 which is connected to an input of the control circuit 19, and the control circuit 19 can provide a RDYCPU signal to the CPU 11 on a line 47. The control circuit 19 outputs control signals 48 which control the cache RAM 13. The control circuit 19 also receives a signal HOLDR from the system bus 17, and can generate signals on lines HOLDA and DO of the system bus 17. The signal DO corresponds functionally to the signal ADS produced by the CPU. The control circuit supplies signals LDCLK, RDCLK, DAOC, DBOC and ABOC to the queue circuit 14, and receives signals QEMPTY and QFULL from it. A system reset signal RESET is provided on a line 49 to the CPU 11, control circuit 19 and queue circuit 14.

The control circuit 19 includes a tag RAM 51, and a check circuit 52 which is responsive to the lines of the address bus 22. The tag RAM 51 stores information identifying each of the locations in the main memory 18 for which the cache RAM 13 currently holds duplicate data. When the CPU 11 outputs a memory address, the check circuit 52 determines whether the address is for a portion of the main memory 18 (or a different memory device) for which the cache RAM 13 is not permitted to duplicate data. The check circuit 52 activates a signal RAM on a line 53 internal to the circuit 19 if the address on address bus 22 is for a memory location as to which the cache RAM 13 is permitted to maintain a duplicate of the data. The check circuit 52 also compares the address on bus 22 to the information in tag RAM 51 in order to determine whether the cache RAM 13 already contains a duplicate of the data. If the cache RAM 13 already contains a duplicate of the data, the check circuit 52 activates a HIT signal on a line 54 internal to the circuit 19.

The cache RAM 13, the control lines 48 for the cache RAM 13, the main memory 18, the tag RAM 51 and the check circuit 52 are, in and of themselves, conventional. They are therefore not disclosed here in further detail. The discussion which follows is directed to details of the structure and operation of the queue circuit 14 and pertinent portions of the control circuit 19 other than the tag RAM 51 and check circuit 52.

Figure 2A:
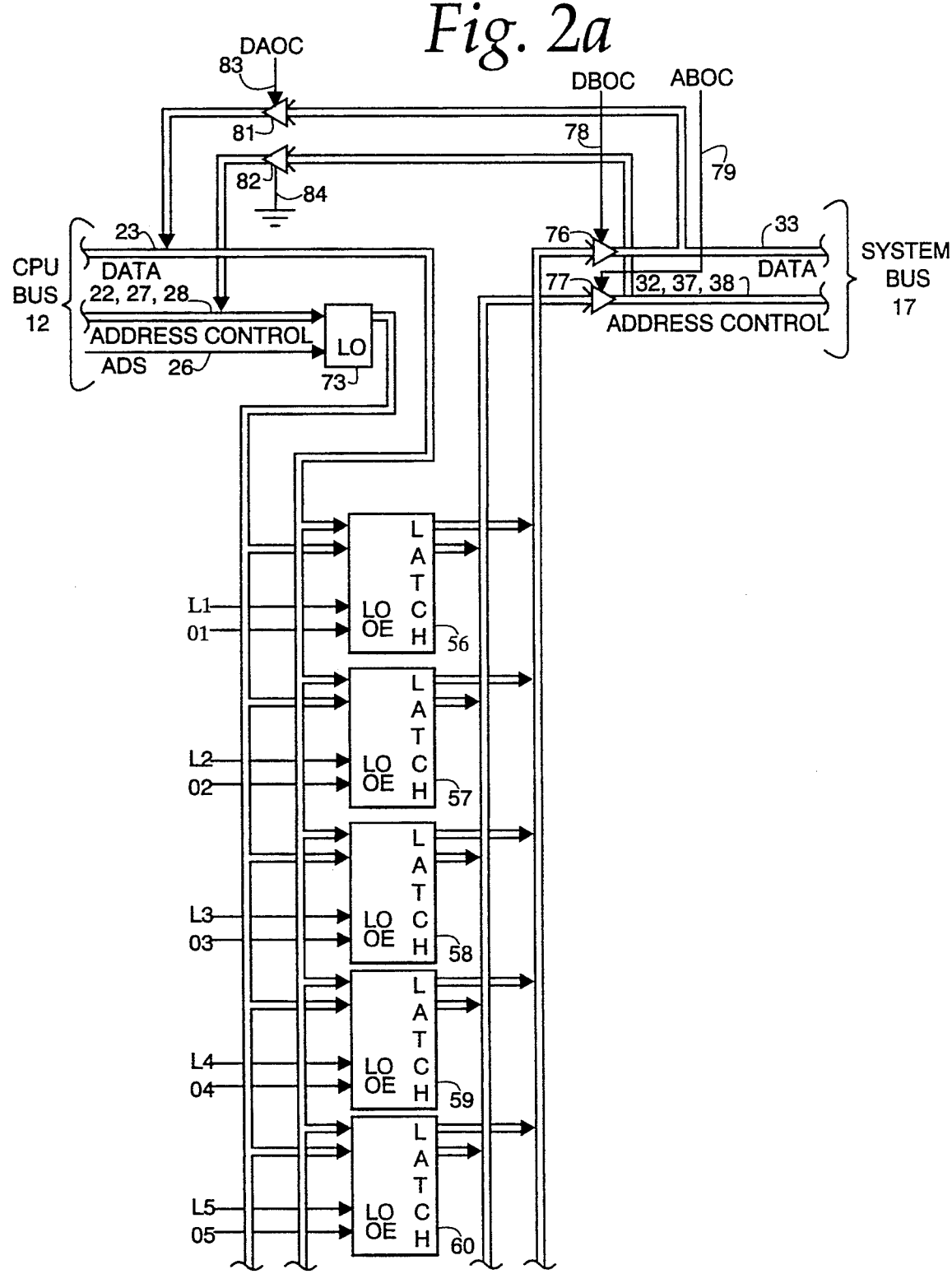
FIG. 2 is a block diagram of a portion of a queue circuit which is part of the system of FIG. 1.
Figure 2B:
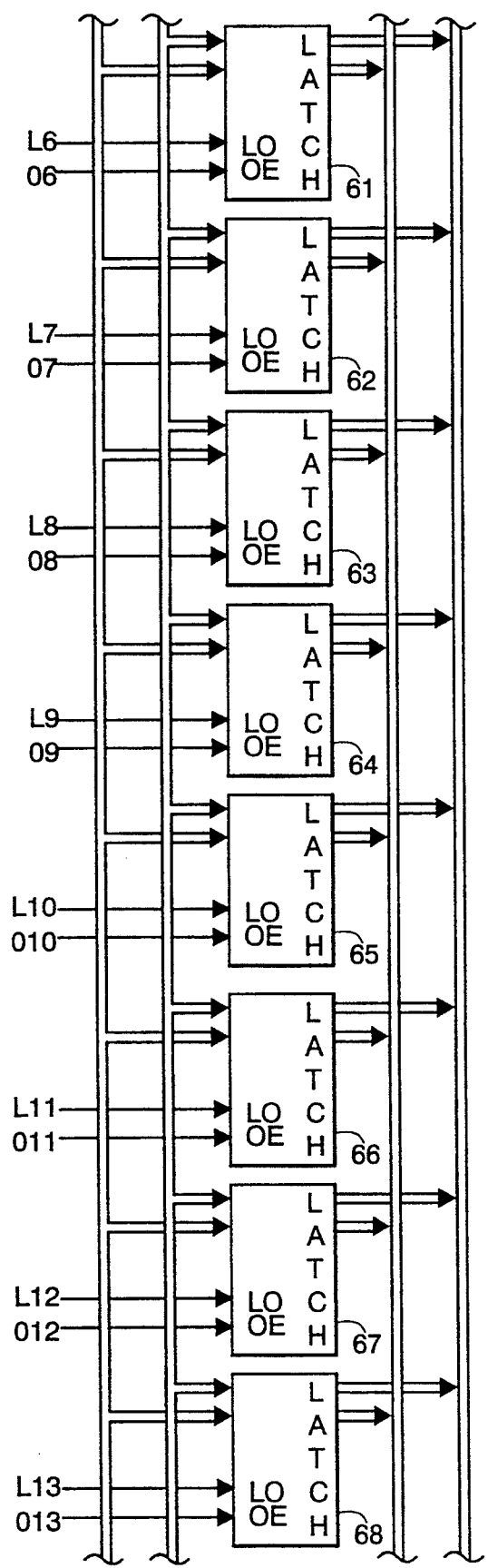
Figure 2C:
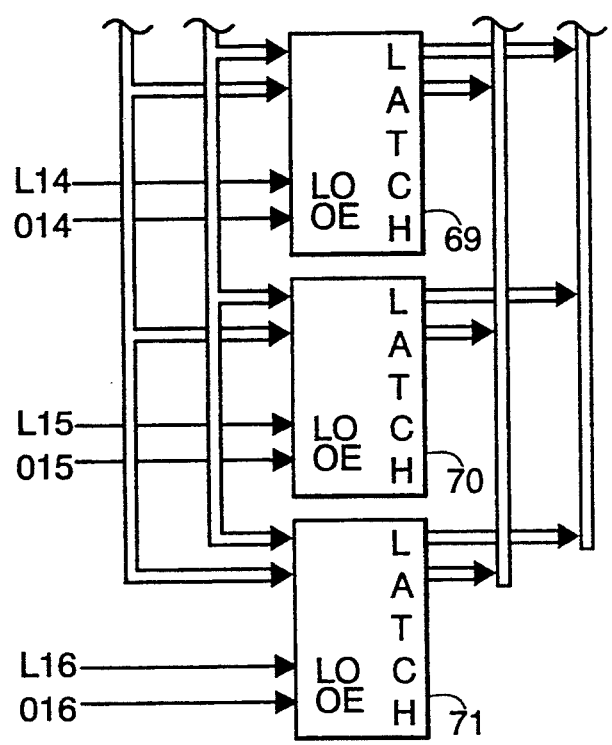

The circuitry of the queue circuit 14 of FIG. 1 is shown in detail in FIGS. 2 through 5. Referring to FIG. 2, the queue circuit 14 includes sixteen latches 56–71. The latches 56–71 each have a latch control input LO (latch open) which, when set to a logic high voltage, causes the latch to pass data from its inputs to its outputs, and which when set to a logic low voltage causes the latch to latch or store the data which was present at its inputs at the time of the transition at its LO input from a logic high voltage to a logic low voltage. The data outputs of each latch are tri-state outputs, and are controlled by an output enable input low of the latch, the latch setting its outputs to a tri-state condition when its input OE is at a logic low voltage and outputting data when the input OE is at a logic high voltage. The latch control inputs LO of each of the latches 56–71 are controlled by respective control signals L1–L16 which are described in more detail later, and the output enable control inputs OE of each of the latches 56–71 are controlled by respective control signals 01–016 which are described in more detail later. The thirty-two lines of the data bus 23 of the CPU bus 12 are connected to inputs of each of the latches 56–71. The address lines 22 and control lines 27 and 28 of the CPU bus 12 are connected to data inputs of a further latch 73, which has a latch control input LO controlled by the ADS signal on line 26 of the CPU bus 12. The outputs of the latch 73 are connected to data inputs of each of the latches 56–71. Thus, the latches 56–71 can each store thirty-two bits of data, twenty-six bits of address, and two control bits, or in other words sixty bits of information. The thirty-two outputs of each latch corresponding to data bits are connected to respective data inputs of thirty-two tri-state buffers shown collectively at 76, and the remaining bits of each latch are connected to respective data inputs of twenty-eight tri-state buffers shown collectively at 77. The buffers 76 are controlled by a common control line DBOC at 78, and the buffers 77 are controlled by a common control line ABOC at 79. The data outputs of the respective buffers 76 are each coupled to a respective line of the data bus 33 of the system bus 17, and the outputs of the respective buffers 77 are each coupled to a respective one of the address lines 32 or control lines 37–38 of the system bus 17. The lines of the data bus 33 of system bus 17 are each connected to the data input of a respective one of thirty-two tri-state buffers which are shown collectively at 81 and which are controlled by a signal DAOC on a common control line 83. The address lines 32 and control lines 36–38 of system bus 17 are each connected to the data input of a respective one of twenty-nine tri-state buffers which are shown collectively at 82 and controlled by a common control line 84. In the preferred embodiment, the control line 84 is grounded in order to permanently disable the buffers 82. The output of each of the buffers 81 is connected to a respective line of the data bus 23 of CPU bus 12, and the output of each of the buffers 82 is connected to a respective one of the address lines 22 or control lines 26–28 of CPU bus 12.

Figure 3:
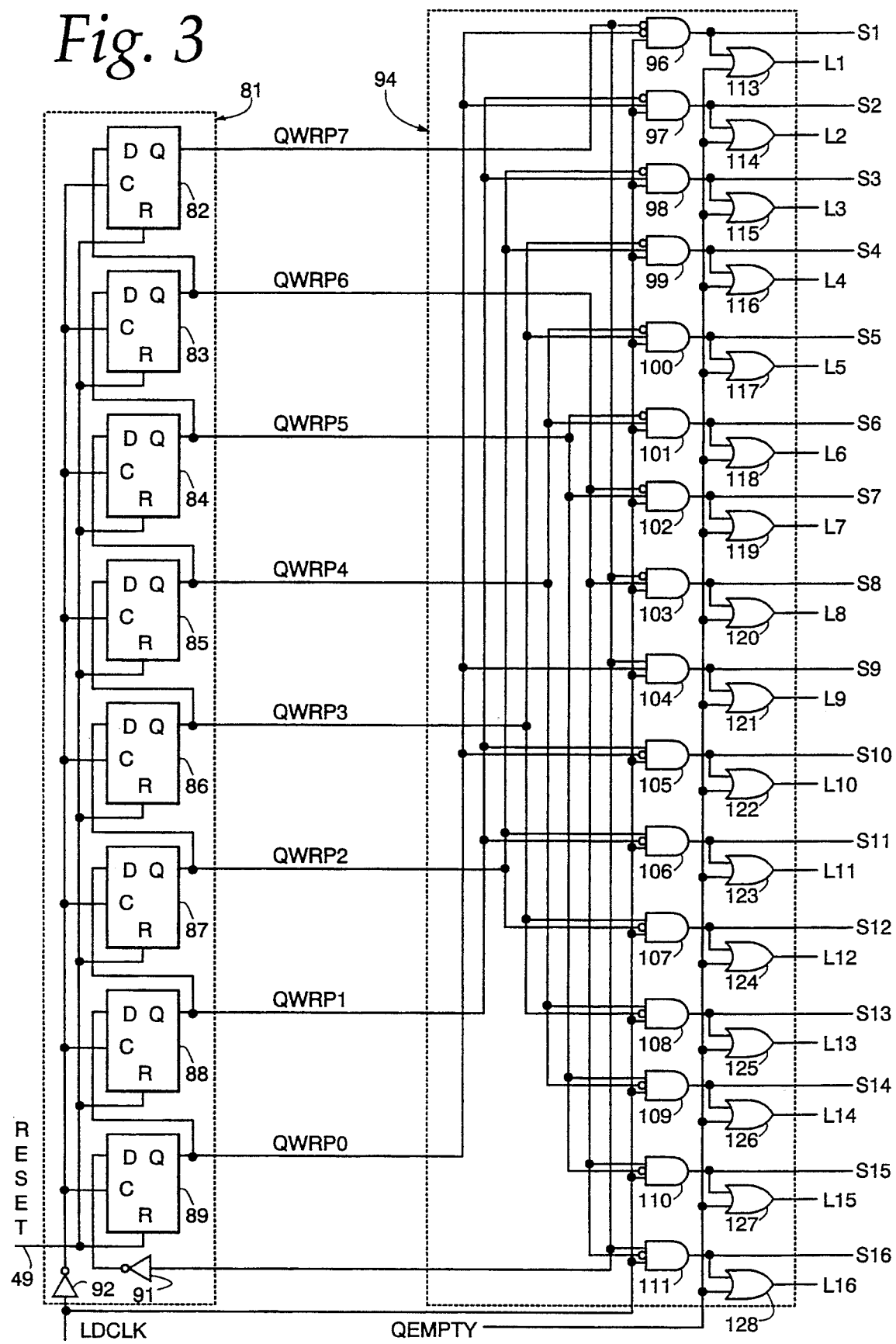
FIG. 3 is a schematic diagram of a further portion of the queue circuit of FIG. 1.

Turning to FIG. 3, a circuit 81 commonly known as a Johnson counter has eight D-type flip-flops 82–89. The D input of each of the flip-flops 82–88 is driven by the data output of the flip-flop immediately below it in FIG. 3. The data input D of flip-flop 89 is driven by the output of an inverter 91, the input of the inverter 91 being driven by the output of flip-flop 82. The system reset line 49 is connected to a reset input R of each of the flip-flops 82–89. The clock input C of each of the flip-flops 82–89 is driven by the output of an inverter 92, the input of which is driven by the signal LDCLK from control circuit 19. A reset on line 49 will clear all of the flip-flops 82–89. A subsequent succession of pulses on the line LDCLK will cause the flip-flop 89 to be set, then the flip-flop 88, then the flip-flop 87, and so forth until all of the flip-flops 82–89 are set, after which the flip-flops 89 through 82 will be cleared in succession. The Johnson counter 81 thus cycles through a sequence having sixteen states. This sequence is depicted in FIG. 6.

FIG. 3 also shows a decode circuit 94, which includes sixteen three-input AND gates 96–111 and sixteen two-input OR gates 113–128. The AND gates 96–111 each have one input controlled by the signal LDCLK. The other two inputs of each of the AND gates 96–111 are coupled to a respective pair of outputs of the Johnson counter 81 in a manner so that each of the AND gates 96–111 detects a respective state of the Johnson counter 81. Thus, when the LDCLK signal is present, one and only one of the AND gates 96–111 corresponding to the current state of the Johnson counter 81 will produce a logic high voltage at its output. For example, when the LDCLK signal is activated and the Johnson counter 81 is in state 1 of FIG. 6, the AND gate 96 will be producing a logic high output voltage and the remaining AND gates 97–111 will each be producing a logic low output voltage. The outputs of the AND gates 96–111 are respectively labeled S1–S16, and are each connected to one input of a respective one of the OR gates 113–128, the other input of each of the OR gates being controlled by a common control signal QEMPTY. The outputs of the OR gates 113–128 are respectively labeled L1–L16, and are the respective latch control lines for the latches 56–71 of FIG. 2. The circuits 81 and 94 together form a load pointer circuit.

Figure 4:
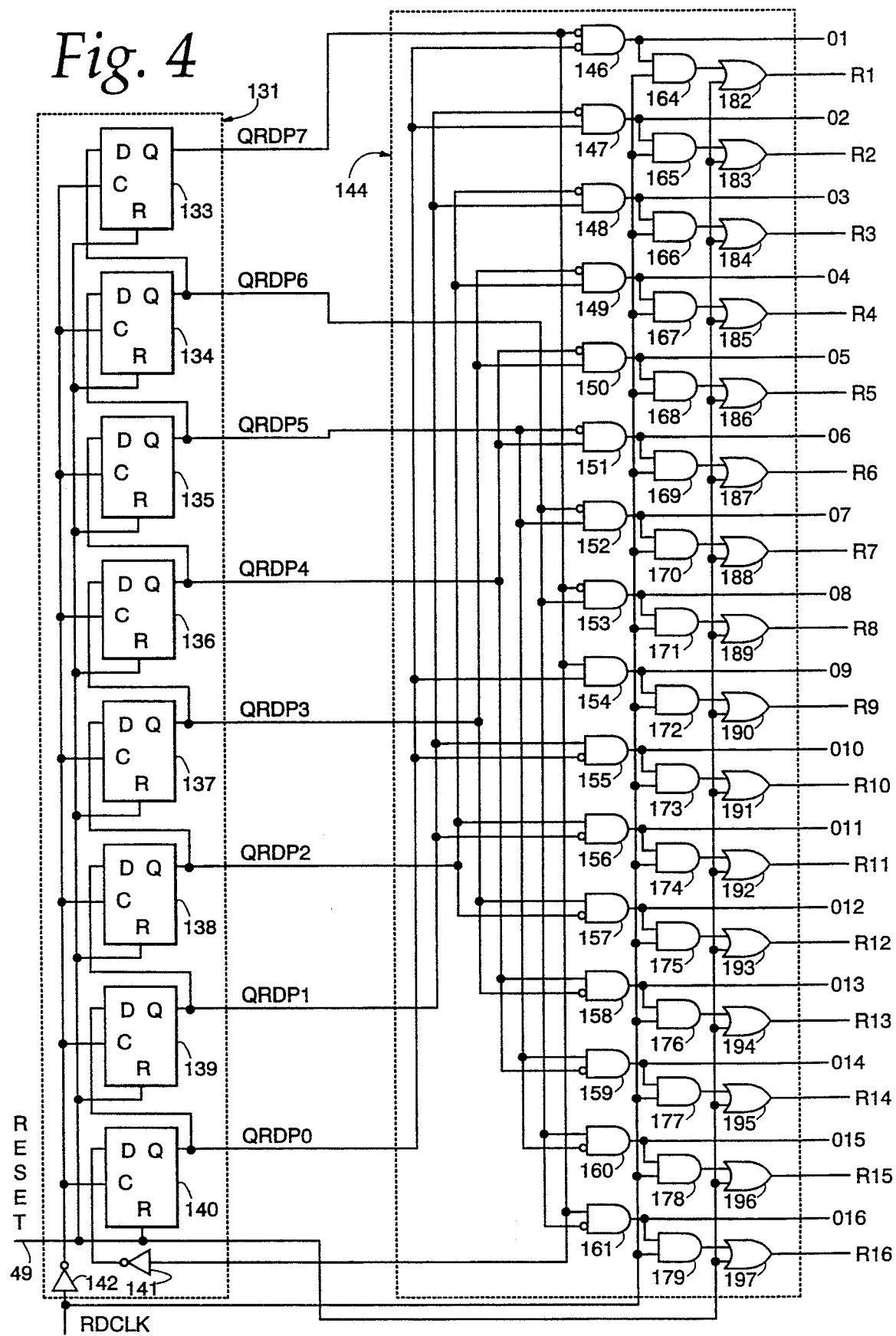
FIG. 4 is a schematic diagram of yet a further portion of the queue circuit of FIG. 1.

In FIG. 4, a further Johnson counter 131, which includes eight flip-flops 133–140 and two inverters 141 and 142, is identical to the Johnson counter 81 of FIG. 3. The only difference is that the clock input C of each flip-flop in the counter 131 is, through inverter 142, driven by the signal RDCLK rather than the signal LDCLK.

FIG. 4 also discloses a decode circuit 144, which includes sixteen two-input AND gates 146–161, sixteen additional two-input AND gates 164–179, and sixteen two-input OR gates 182–197. The two inputs of each of the AND gates 146–161 are connected to a respective pair of outputs of the Johnson counter 131, and each detect a respective state of the Johnson counter 131. Thus, since the Johnson counter 131 can only be in one of its 16 states at any given point in time, one and only one of the AND gates 146–161 will be producing a logic high voltage at any given point in time. The outputs of the AND gates 146–161 are respectively labeled 01–016, and are each connected to the tri-state output enable input OE of a respective one of the latches 56–71 in FIG. 2.

The AND gates 164–179 each have one input connected to the output of a respective one of the AND gates 146–161, the control signal RDCLK being connected to the other input of each of the AND gates 164–179. Thus, when the signal RDCLK is present, one and only one of the AND gates 164–179 will be producing a logic high output voltage. The OR gates 182–197 each have one input connected to the output of a respective one of the AND gates 164–179, the system reset signal RESET on line 49 being connected to the other input of each of the OR gates 182–197. The outputs of the OR gates 182–197 are respectively labeled R1–R16. The circuits 131 and 144 together form a read pointer circuit.

Figure 5A:
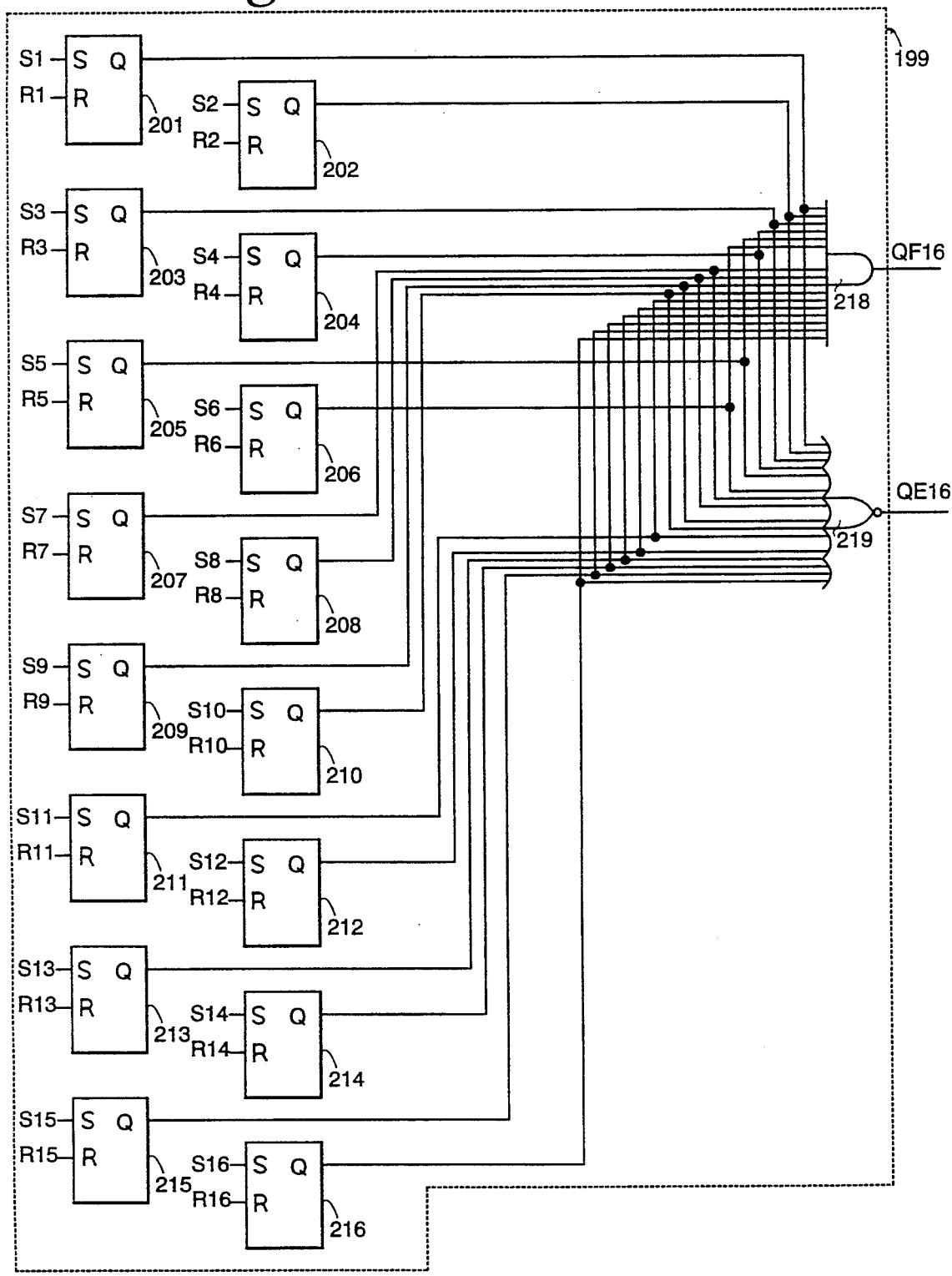
FIG. 5 is schematic diagram of still another portion of the queue circuit of FIG. 1.
Figure 5B:
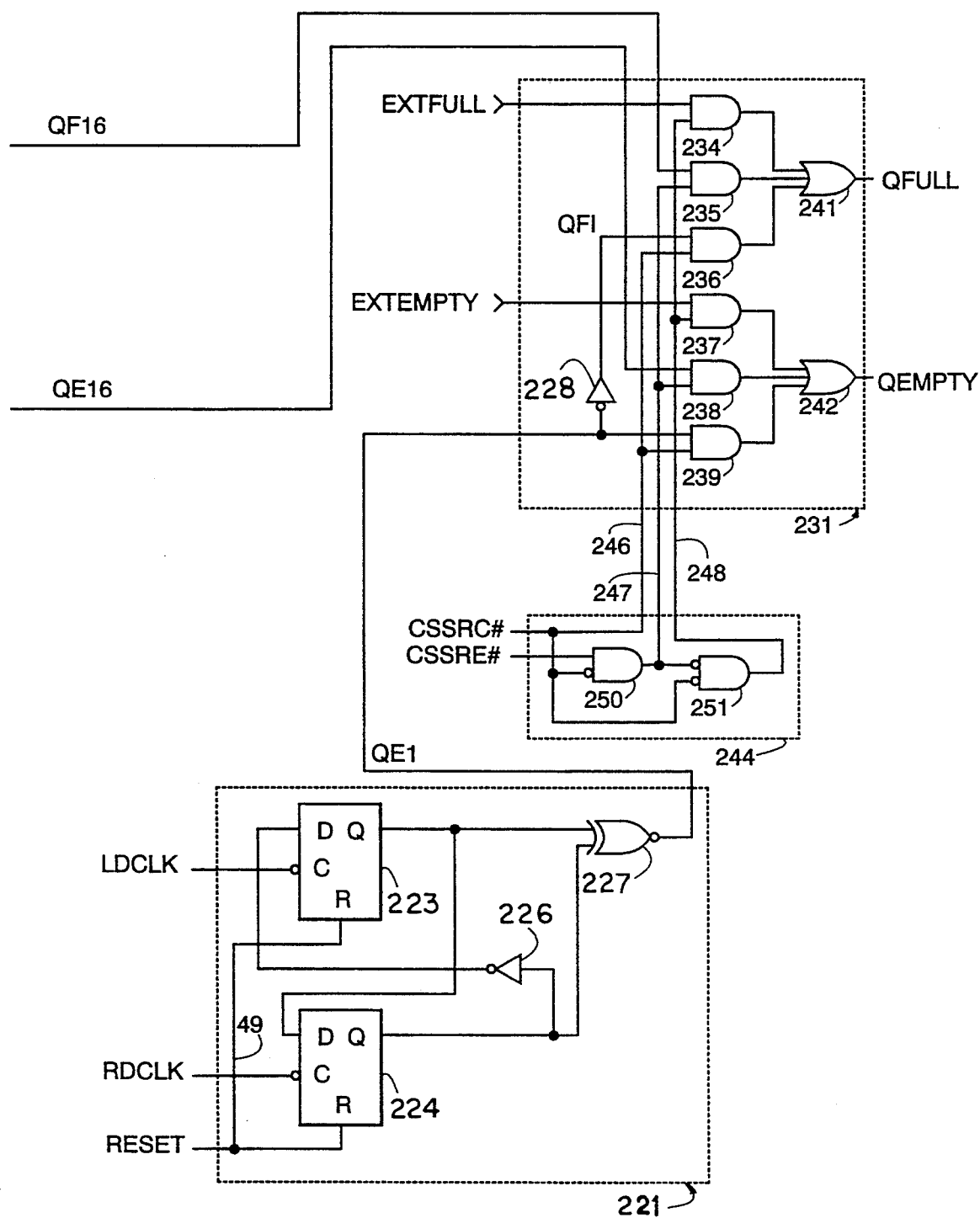

Referring to FIG. 5, a circuit 199 includes sixteen S-R type flip-flops 201–216. The S input of each flip-flop is driven by a respective one of the lines S1–S16 from the decoder circuit 94 of FIG. 3, and the R input of each flip-flop is driven by a respective one of the lines R1–R16 from the decoder circuit 144 of FIG. 4.

The circuit 199 also includes a sixteen-input AND gate 218, the inputs of which are each connected to the output of a respective one of the flip-flops 201–216, and includes a sixteen-input NOR gate 219, the inputs of which are each connected to the output of a respective one of the flip-flops 201–216.

A circuit 221 includes two D-type flip-flops 123 and 223, which each have a reset input R connected to the system reset line 49. The output of flip-flop 223 is connected to the D input of flip-flop 224, and the output of flip-flop 224 is connected to the input of an inverter 226, the output of which is connected to the D input of flip-flop 223. The clock input C of flip-flop 223 is driven by the signal LDCLK, and the clock input C of flip-flop 224 is driven by the signal RDCLK. A two-input exclusive NOR (XNOR) gate 227 has each input connected to the output of a respective one of the flip-flops 223 and 224. The output of XNOR gate 227 is labeled QE1, and is connected to the input of an inverter 228, the output of which is labeled QF1.

A dual three-to-one selector circuit 231 includes six two-input AND gates 234–239, an OR gate 241 which has three inputs respectively connected to the outputs of AND gates 234–236, and an OR gate 242 which has three inputs respectively connected to the outputs of AND gates 237–239. The outputs of OR gates 241 and 242 are respectively labeled QFULL and QEMPTY. The AND gate 236 has one input connected to the output QF1 from inverter 128, and the other input connected to a control line 246 from a selector control circuit 244. The gate 239 has one input driven by the output QE1 of XNOR gate 227, and its other input driven by the line 246. The AND gate 235 has one input driven by the output QF16 of the AND gate 218, and its other input driven by a control signal 247 from control circuit 244. The AND gate 238 has one input driven by the output QE16 of NOR gate 219, and its other input driven by the line 247. The AND gate 234 has one input driven by a signal EXTFULL, and its other input driven by a control line 248 from control circuit 244. The AND gate 237 has one input driven by a signal EXTEMPTY and its other input driven by the line 248. The control circuit 244 is driven by the signals CSSRC# and CSSRE# from the control register 41 in FIG. 1 and, based on the contents of the control register, activates one and only one of the control lines 246, 247 and 248 at any given point in time. If line 248 is activated, then selector 231 uses line EXTFULL to drive line QFULL and uses line EXTEMPTY to drive line QEMPTY. If line 247 is activated, selector 231 uses line QF16 to drive line QFULL and uses QE16 to drive line QEMPTY. If line 246 is activated, selector 231 uses line QF1 to drive line QFULL and uses line QE1 to drive line QEMPTY.

Selector control circuit 244 includes two AND gates 250 and 251 which appropriately decode the signals CSSRC# and CSSRE# so that circuit 244 enables a selected one of the lines 246–248 at any given point in time.

Assume that the lines CSSRC# and CSSRE# are respectively a logic low voltage and a logic high voltage. Assume that a system reset occurs, which will have the effect of resetting the flip-flops 223 and 224 in FIG. 5, the flip-flops 82–89 in FIG. 3 and the flip-flops 133–140 in FIG. 4, and which will cause each of the OR gates 182–197 in FIG. 4 to output a logic high voltage on each of the lines R1–R16 so that each of the flip-flops 201–216 in FIG. 5 is reset. Now assume that the CPU 11 of FIG. 1 decides to write a data word into the main memory 18. The CPU 11 outputs the word on data bus 23, along with appropriate address and control signals on lines 22 and 26–28. The data on the data bus 23 will be presented to the inputs of each of the latches 56–71 in FIG. 2, and the address and control information on lines 22, 27 and 28 will be presented to the data inputs of latch 73. The ADS signal produced by the CPU 11 on line 26 to initiate the memory write will, as it terminates, cause latch 73 to latch the information present at its inputs. In a manner described in more detail later, the control circuit 19 of FIG. 1 responds to the memory write by activating the LDCLK signal. Since the flip-flops of counter 81 in FIG. 3 are all reset, this will cause AND gate 96 in FIG. 3 to activate its output and thereby generate a pulse on line S1 and, through OR gate 113, on line L1. The pulse on line L1 causes the latch 56 in FIG. 2 to accept and latch the data, address and control information present at its inputs. The pulse on line S1 will cause the flip-flop 201 in FIG. 5 to be set. Each of the sixteen flip-flops 201–216 in FIG. 5 corresponds to a respective one of the latches 56–71 in FIG. 2, and the setting of flip-flop 201 is an indication that the corresponding latch 56 now contains a data word which is to be written into the main memory. The trailing edge of the pulse on the line LDCLK causes the counter 81 in FIG. 3 to change to its next state, which is state 2 in FIG. 6. If the CPU 11 then outputs another data word in a similar manner, the second word will be loaded into the latch 57 of FIG. 2 and flip-flop 202 of FIG. 5 will be set in a similar manner. If the CPU 11 outputs a third word in a similar manner, it should be evident that the word will be loaded into the latch 58, and the flip-flop 203 will be set. Assume that the main memory is very slow in relation to the CPU, and that the transfer of the first data word from latch 56 to memory 18 is still in progress. Since the circuit of FIG. 2 has only sixteen of the latches 56–71, it should be evident that the CPU can deposit only thirteen more data words before the storage capacity of queue circuit 14 will be full. As the last of these words is deposited into the last latch 71 and the last of the flip-flops 216 is set, the circumstance will arise that all of the flip-flops 201–216 are set, so that all of the inputs to the AND gate 218 are high, which will cause the AND gate 218 to output a logic high voltage on line QF16, which is sent by selector circuit 231 of FIG. 5 across line QFULL to the control circuit 19 (FIG. 1) to indicate that queue circuit 14 is full. As described in more detail later, the control circuit 19 will not generate additional LDCLK signals so long as the queue circuit 14 is full.

The NOR gate 219 will output a logic high voltage only if all of the flip-flops 201–216 are reset, or in other words only if the queue circuit 14 is empty because latches 56–71 of FIG. 2 contain no data which has not already been written into the main memory 18. The signal QE16 output by gate 219 in FIG. 5 is supplied by selector 231 across line QEMPTY to the control circuit 19 of FIG. 1. If the queue circuit 14 contains one or more words which are waiting to be written into the main memory 18, the line QEMPTY will be a logic low to indicate to the control circuit 19 that it should cause the queue circuit 14 to write the data words into the main memory 18 as soon as the system bus 17 becomes available.

Now, the manner in which data is transferred from the queue circuit to the main memory will be described, starting at the point in the preceding discussion at which the first data word was loaded into the first latch 56. It will be noted that the Johnson counter 131 of FIG. 4 is still in its initial condition at this point, and thus AND gate 146 will be outputting a logic high voltage on line 01 which, in FIG. 2, enables the latch 56 to output the data stored therein to the inputs of buffers 76 and 77, the outputs of the other latches 57-71 being in a tri-state condition. When the system bus 17 becomes available, the control circuit 19, given the fact that the signal QEMPTY is not activated, will generate the signals RDCLK, ABOC, DBOC and DO in a manner described in more detail later. As mentioned above, the signal DO is the functional equivalent for system bus 17 of the signal ADS of CPU bus 12. The signals ABOC and DBOC will enable the tri-state buffers 76 and 77 in FIG. 2, so that the contents of latch 56 are gated out onto the lines 32, 33 and 37-38 of the system bus 17, causing the main memory 18 to receive both the data word from latch 56 and also the address and control signals required to cause the main memory 18 to properly store the data. At the same time, the pulse on line RDCLK will cause the AND gate 164 in FIG. 4 to output a logic high voltage so that the OR gate 182 produces a pulse on line R1 which resets the flip-flop 201 in FIG. 5, in order to provide an indication that the data which was present in the latch 56 of the queue circuit 14 has now been written into the main memory 18. The pulse on the line RDCLK will also clock the Johnson counter 131 in FIG. 4 and cause it to move to its next state, in which it causes AND gate 147 to output a logic high voltage on line 02 which enables the tri-state output of latch 57 so that the data, address and control information in latch 57 is applied to the inputs of the tri-state buffers 76 and 77. Since it has been assumed that in the meantime the CPU has loaded all the rest of the latches, the control circuit 19 will still be receiving a logic low voltage on the line QEMPTY because the queue circuit 14 is not yet empty, and the control circuit 19 will in due course generate an additional pulse on each of the lines RDCLK, ABOC, DBOC, and DO which will cause the word in latch 57 to be stored in a similar manner. This will proceed until all of the flip-flops 201-216 have been reset and thus all of the data in latches 56-71 has been stored in memory 18.

It should be noted that, as soon as the data word in latch 56 was stored in the memory 18 and the flip-flop 201 was reset, the AND gate 218 would have a logic low voltage at one of its inputs from the flip-flop 201, and would thus output a logic low voltage which would be routed by circuit 231 to line QFULL in order to tell the control circuit 19 that it could, if necessary, generate a further signal on the line LDCLK. Thus, if the CPU 11 was waiting to deposit a further data word into the queue circuit 14, the control circuit 19 would generate the signal LDCLK to cause that further word to be loaded into the latch 56 and to again set the flip-flop 201, even though the queue circuit 14 was still in the process of writing the data from latches 57-71 into the main memory 18.

The memory 18 will in most cases be somewhat faster than assumed above, and will in fact accept one or more of the data words loaded into the latches before the CPU can load all of the rest of the latches. Nevertheless, since the CPU is in fact faster than the memory, it can eventually fill the queue, and the principles of queue operation discussed above are exactly the same in the case of the somewhat faster main memory 18.

The foregoing discussion explains a first mode of operation of the queue circuit 14 in which the queue circuit 14 can accept from the CPU 11 and temporarily store up to 16 words. The queue circuit 14 has been designed to also operate in a second mode where it is capable of accepting from the CPU 11 and storing only one word at a time. To implement this mode, the queue control register 41 in FIG. 1 is set so that the lines CSSRC# and CSSRE# cause the selector control circuit 244 of FIG. 5 to activate the line 246, so that selector 231 uses signal QF1 to drive line QFULL and uses line QE1 to drive line QEMPTY. Assume that a system reset has occurred, so that the flip-flops 223 and 224 of FIG. 5, the flip-flops 82-89 of FIG. 3, and the flip-flops 133-140 of FIG. 4 are all reset. In response to this condition, the XNOR gate 227 in FIG. 5 will be outputting a logic high voltage on line QE1, which is sent by selector 231 on line QEMPTY to the control circuit 19 to indicate that the queue is empty. Therefore, when the CPU 11 initiates a memory write, the control circuit 19 will generate the signal LDCLK, which in FIG. 3 will cause the AND gate 96 to output a logic high voltage on line L1 which will cause the latch 56 in FIG. 2 to accept and store the data, address and control information from the CPU 11. The trailing edge of the signal LDCLK will cause the Johnson counter 81 to change to its next state, and will also cause the flip-flop 223 to be set so that the XNOR gate 227 changes the state of its output, causing the selector 231 to change the line QFULL to a logic high voltage and the line QEMPTY to a logic low voltage. The activation of line QFULL will tell the control circuit 19 that the queue circuit 14 is now full and thus cannot presently accept further words from the CPU 11, and the deactivation of the line QEMPTY will tell the control circuit 19 to generate the signals RDCLK, ABOC, DBOC and DO as soon as the system bus 17 is available in order to write the data from latch 56 into the main memory 18 in the same basic manner already described above. The trailing edge of the signal RDCLK causes the Johnson counter 131 to advance to its next state, and also causes the flip-flop 224 to be set, so that the XNOR gate 227 again changes its output and thus the selector circuit 231 will deactivate the QFULL signal and activate the QEMPTY signal. The next data word from the CPU 11 will be stored in the latch 57, which will again render the queue circuit 14 "full", and the word will subsequently be written from the latch 57 to the main memory 18 in order to empty the queue. The next word from the CPU will be stored in the latch 58, and subsequently written to the main memory 18. Thus, the latches 56-71 are used in succession, but in this mode only one is used to store a data word at any given point in time.

The queue circuit 14 can also operate in a third mode in which it is effectively turned off. This is effected by simply preventing the control circuit 19 from generating the LDCLK signal when the CPU 11 carries out a memory write. Assume that the system reset on line 49 has occurred so that the flip-flops 82-89 of FIG. 3 and the flip-flops 133-140 of FIG. 4 are all reset. Since the queue is necessarily empty, in FIG. 3 the QEMPTY signal will be causing each of the OR gates 133-128 to output a logic high voltage on lines L1-L16, and these signals will cause each of the latches 56-71 in FIG. 2 to pass the data present at its inputs directly through to its tri-state output circuit. In FIG. 4, the AND gate 146 will be producing a logic high voltage on line 01, whereas AND gates 147-161 will be producing logic low voltages on lines 02-016, as a result of which the tri-state output of latch 56 in FIG. 2 will be enabled and the tri-state outputs of latches 57-71 in FIG. 2 will be disabled, so that latch 56 will be actively driving the inputs of buffers 76 and 77. The signals ABOC and DBOC will be enabled in order to enable the tri-state buffers 76 and 77 in order to effect the memory write.

Thus, the data, address and control information on the lines of the CPU bus 12 will flow through latches 73 and 56 and tri-state buffers 76 and 77 to the lines of the system bus 17 so that the CPU 11 is in fact directly controlling the main memory 18. In essence, the queue circuit 14 is effectively electrically transparent in this particular operational mode.

The queue circuit 14 can also operate in a fourth mode where the full and empty signals are controlled by the signals EXTFULL and EXTEMPTY, which in a sense is an external control mode. In particular, the queue control register 41 of FIG. 1 can be set so that the lines CSSRC# and CSSRE# cause the selector control circuit 244 of FIG. 5 to activate line 248 so that the selector circuit 231 uses external signal EXTFULL to drive line QFULL and uses external signal EXTEMPTY to drive line QEMPTY. This fourth mode of operation is provided to allow for modifications of the control circuitry shown in FIGS. 2-4. For example, the circuitry shown in FIGS. 2-4 could be provided on a removable circuit card, which could be replaced with a circuit card containing an enhanced version of the circuitry, for example a circuit having thirty-two latches rather than the sixteen latches shown in FIG. 2. This replacement circuit card would also include circuitry comparable to that shown in FIG. 5 for generating appropriate full and empty signals consistent with its operation, for example full and empty signals reflecting a queue depth of thirty-two rather than the depths of sixteen and one handled by the circuitry of FIG. 5. These full and empty signals from the replacement circuit card would be applied to the lines EXTFULL and EXTEMPTY shown in FIG. 5.

FIG. 7 is a table setting forth the necessary states of signals CSSRB#, CSSRC# and CSSRE# required to implement each of the four operational modes of the queue circuit 14.

When the CPU 11 attempts to read data from the main memory 18 for which there is no duplicate in the cache RAM 13, the data has to be obtained from the main memory 18. In this situation, if the queue circuit 14 contains any data which is waiting to be stored in the main memory 18, all of the data in the queue circuit 14 must be stored in the main memory 18 before the reading of data from main memory 18 can take place. This is because the location which the CPU 11 is attempting to read in the main memory 18 may be a location which the queue circuit 14 has been instructed to update, and thus the queue circuit 14 must be permitted to write all of the data which it contains into the main memory 18 before the CPU 11 reads data from the main memory 18 in order to ensure that the CPU 11 does not read obsolete information from a particular location in the main memory 18 while the updated data for that location is waiting in the queue circuit 14 to be written into the main memory 18. Once the queue circuit 14 is empty, the reading of data from the main memory 18 proceeds. In this situation, since the queue is now empty, the address and control information from the CPU bus 12 will pass through the latches and the tri-state buffers 77 of the circuit of FIG. 2 to the system bus 17 as if the queue circuit 14 were electrically transparent. The signal DBOC controlling the tri-state buffers 76 will be deactivated so that the queue circuit 14 is not driving the data bus 33 of system bus 17, and thus the main memory 18 can drive the data bus 33. The signal DAOC will be activated to enable the tri-state buffers 81, so that the data placed on data bus 33 of the system bus 17 is supplied across the data bus 23 of system bus 12 to the CPU 11.

The manner in which the control circuit 19 of FIG. 1 generates the necessary control signals for the cache RAM 13 and queue circuit 14 will now be described. The control circuit 19 effectively has four independent state machines to generate the signals, FIGS. 8-11 each depicting the state diagram for a respective one of the state machines.

Figure 8A:
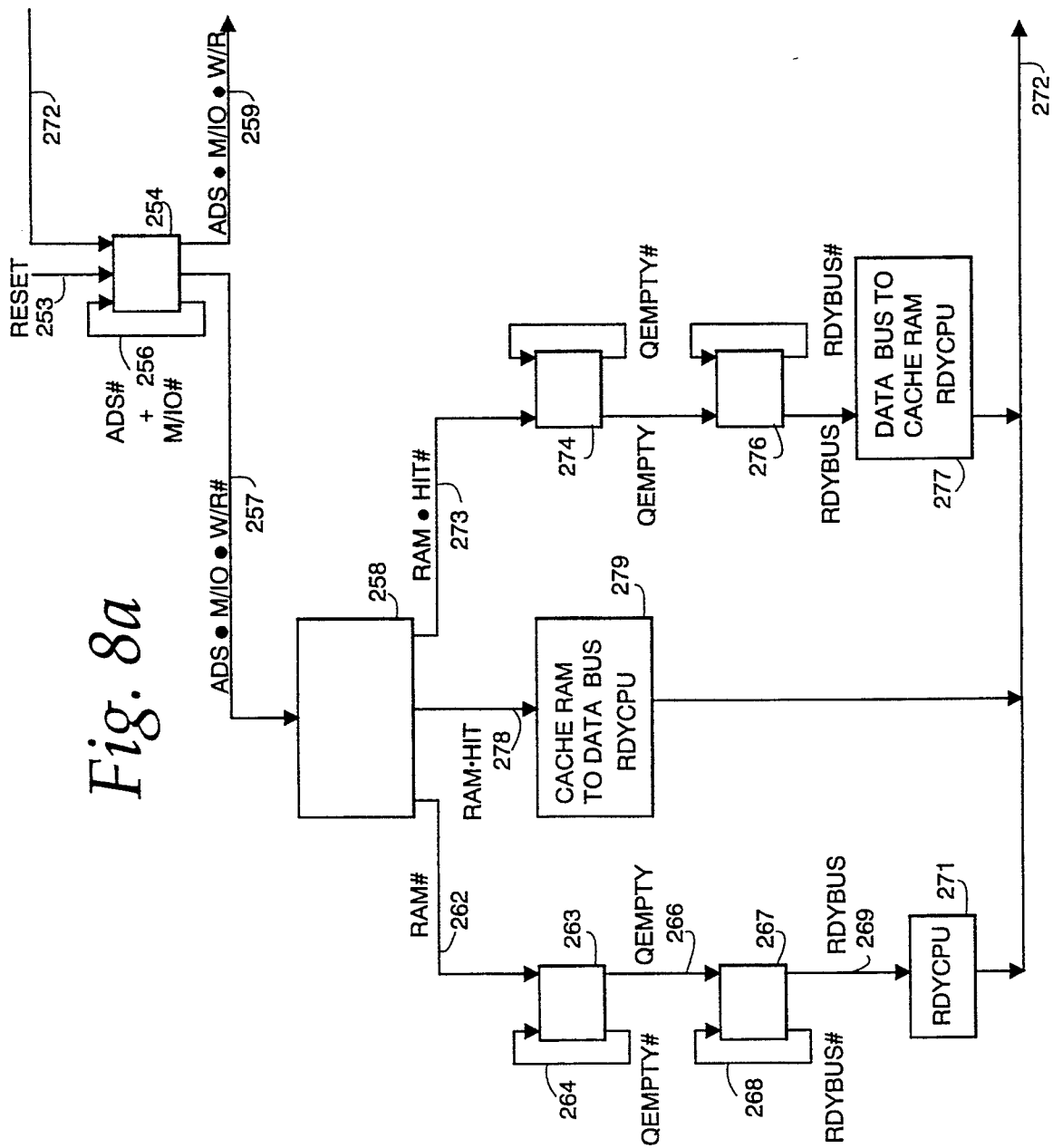
FIG. 8 is a state diagram depicting diagrammatically the operation of a first portion of a control circuit which is a component of the system of FIG. 1.
Figure 8B:
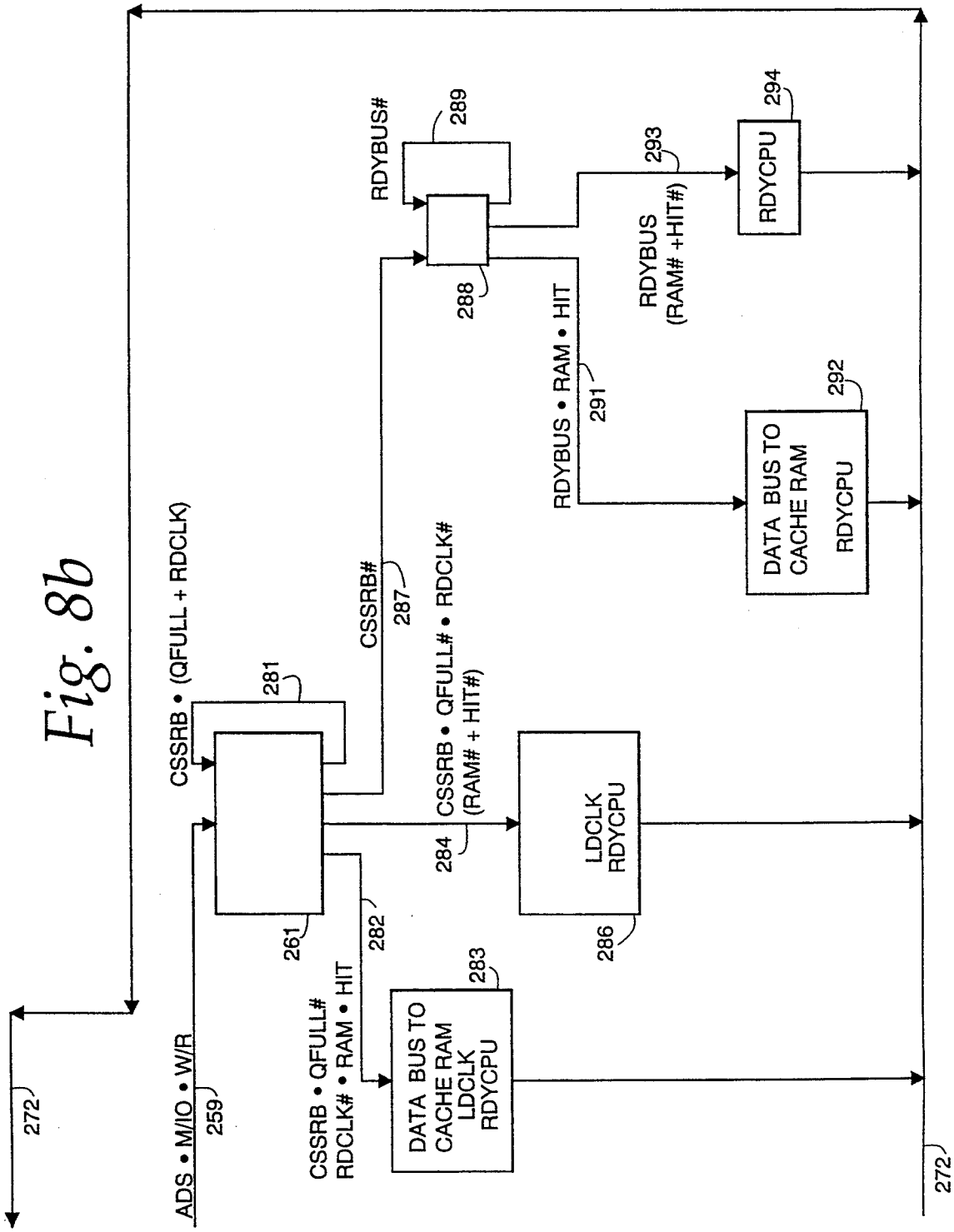

Beginning with the state diagram of FIG. 8, a system reset forces the state machine, as indicated by an arrow at 253, into initial state 254. So long as the CPU signals ADS and M/IO on lines 26 and 27 are not activated, the CPU 11 is not attempting to initiate a memory cycle and the state machine therefore is maintained in initial state 254, as shown diagrammatically by arrow 256. When these signals are both activated to identify the start of a memory cycle, the state machine proceeds at 257 to state 258 if the W/R signal on line 28 is a logic low voltage to indicate that the CPU 11 is initiating a memory read, and proceeds at 259 to state 261 if the W/R signal is a logic high voltage to identify a memory write. In the case of a memory read, a check is made in state 258 of the signal RAM shown at 53 in FIG. 1, in order to determine whether the location being read is one for which the cache RAM 13 is not permitted to duplicate data. If so, a transition is made at 262 to state 263. Since the cache RAM 13 is not operative for this location, the data must necessarily be read from the main memory 18, and as mentioned above the queue circuit 14 must be empty before any such read takes place. Accordingly, as shown diagrammatically at 264, the state machine stays in state 263 so long as the signal QEMPTY is deactivated, and only upon its activation proceeds at 266 to state 267. As also mentioned above, the main memory 18 is relatively slow, and it generates a signal RDYBUS on line 46 in FIG. 1 when it has finally placed the requested data on the data bus 33, in order to notify the control circuit 19 that the memory read cycle can be concluded. Therefore, as shown diagrammatically at 268 in FIG. 8, the state machine remains in state 267 until the RDYBUS signal is received from the main memory 18, and then proceeds at 269 to state 271, where it generates the signal RDYCPU on line 47 in FIG. 1 in order to notify the CPU 11 that the requested data is present on data buses 33 and 23 and that the CPU 11 should thus accept the data and then proceed with its processing. In FIG. 8, the state machine then proceeds unconditionally at 272 back to its initial state 254. In state 258, if it was determined that the signal RAM was activated to indicate that the location addressed by the CPU 11 is one which the cache RAM is permitted to duplicate, the signal HIT shown at 54 in FIG. 1 is checked to determine whether the cache RAM 13 already contains a duplicate of the data in that location. If the line HIT is not activated and thus the cache RAM 13 does not yet contain a duplicate of the data, then the state machine of FIG. 8 proceeds at 273 to state sequence 274, 276 and 277, where data is read from the main memory 18 in the same basic manner just described in association with states 263, 267 and 271. The difference is that, in state 277, control signals are generated at 48 in FIG. 1 to cause the cache RAM 13 to store a duplicate of the data which the main memory 18 is providing to the CPU 11, so that the data will be present in the cache RAM 13 in the event the CPU 11 again attempts to read the data. Control then proceeds unconditionally at 272 back to the initial state 254.

Returning again to state 258, if the signal HIT was activated to indicate that the cache RAM 13 already contains a duplicate of the data in the location which the CPU 11 is attempting to read, a transition would occur at 278 to state 279, where control signals are generated at 48 in FIG. 1 to cause the cache RAM 13 to output the duplicate of the data onto the data bus 23 so that the CPU 11 receives the data quickly and can continue its processing without stopping and waiting for the main memory 18. The signal RDYCPU is generated in state 279 to tell the CPU 11 to accept the data and continue its processing. It should be noted that, since data is being read from the cache RAM 13, rather than from the main memory 18, there is no need to wait for the queue circuit 14 to be emptied or for the main memory to locate and output the data.

Turning now to state 261, the situation of a memory write cycle is presented. If the queue circuit 14 is turned on (control register 41 of FIG. 1 is driving line CSSRB# to a logic low voltage) and if the queue circuit 14 is full, then as mentioned above there is no room in the queue circuit 14 for the data from the CPU 11, and it is necessary to wait for the queue circuit 14 to write at least one word to the main memory 18 in order to provide room in the queue circuit 14 for the word the CPU 11 is currently in the process of writing. During this wait, the state machine of FIG. 8 is retained in state 261, as shown diagrammatically at 281. Also, the state machine is maintained at 281 in state 261 if another of the state machines (described later) is generating the signal RDCLK. At such point in time when neither of the signals QFULL and RDCLK is present, the signals RAM and HIT are checked, and a transition is made at 282 to state 283 if these signals are both activated, or a transition is made at state 284 to state 286 if these signals are not both activated. State 283 represents the condition where the cache RAM 13 already contains a duplicate of the data in the location of main memory 18 which is being updated, and therefore control signals are generated at 48 in FIG. 1 to cause the cache RAM 13 to store the data which the CPU 11 is sending across data bus 22 to the queue circuit 14, so that the cache RAM 13 will contain the updated version of the data being sent to the main memory 18. In state 283, the signal LDCLK is generated to cause the queue circuit 14 to accept the data in the manner described above, and the signal RDYCPU on line 47 is generated to tell the CPU 11 to terminate the memory write cycle and proceed with its normal processing.

State 286, on the other hand, represents the situation where the cache RAM 13 does not contain a duplicate of the data for the location being updated in the main memory 18, as a result of which it is not necessary to update the cache RAM 13. State 286 is thus identical to state 283, except that the control signals 48 for the cache RAM 13 do not cause the cache RAM 13 to store any data.

If the signal CSSRB# from the register 41 in FIG. 1 is a logic high voltage to indicate that the queue circuit 14 is disabled, the state machine ignores the paths 281, 282 and 284, and instead proceeds immediately at 287 to state 288. This represents the condition where the queue circuit 14 is essentially electrically transparent during the memory write and the CPU 11 therefore essentially has direct control of the memory 18. The state machine will be maintained in state 288 as shown diagrammatically 289 until the signal RDYBUS is activated by the memory 18 to indicate that the memory 18 has accepted the data. Then, the state machine checks the states of the signals HIT and RAM, and proceeds at 291 to state 292 if both HIT and RAM are activated, or otherwise proceeds at 293 to state 294. State 292 represents the condition where the cache RAM 13 already contains a duplicate of the data in the location of main memory 18 being updated, and therefore control signals are generated at 48 which cause the cache RAM 13 to store the updated data which has been written into the main memory 18. The signal RDYCPU is also generated to tell the CPU 11 to terminate the write and proceed with its normal processing. The state 294 represents the situation where the cache RAM 13 does not already contain a duplicate of the data for the location being updated in main memory 18, as a result of which there is no need to update the cache RAM 13 and thus no control signals are generated at 48 which would cause the cache RAM 13 to store any data. The state machine simply generates the signal RDYCPU in order to tell the CPU 11 to terminate the memory cycle and proceed. From each of the states 283, 286, 292 and 294, control proceeds unconditionally at 272 to the initial state 254.

Figure 9:
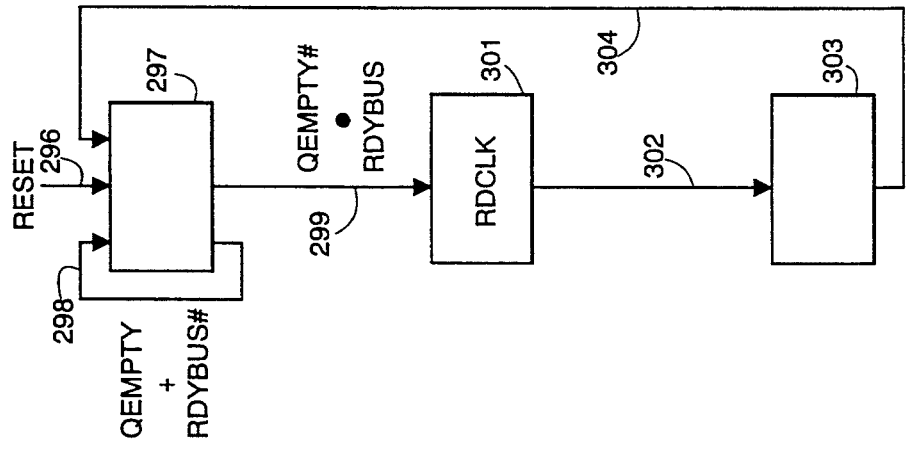
FIG. 9 is a state diagram showing diagrammatically the operation of a second portion of the control circuit of FIG. 1.

FIG. 9 depicts the relatively simple state machine which controls the generation of the RDCLK signal. A system reset, as shown by arrow 296, forces the state machine into initial state 297. So long as the queue circuit 14 is empty and generating signal QEMPTY, the state machine is maintained at 298 in state 297 because there is no need to generate the signal RDCLK to initiate writing of data from the queue circuit 14 to the main memory 18. If the queue circuit 14 contains data, then generation of the signal RDYBUS means the memory is concluding storage of a word from the queue circuit 14. When the signal QEMPTY is deactivated and the signal RDYBUS is activated, the state machine proceeds at 299 to state 301, where it generates the signal RDCLK to update the queue circuit to reflect the fact that a word has been transferred to memory 18, then proceeds at 302 to state 303, and then returns at 304 to initial state 297. If the queue circuit 14 is not yet empty, the cycle will repeat.

Figure 10:
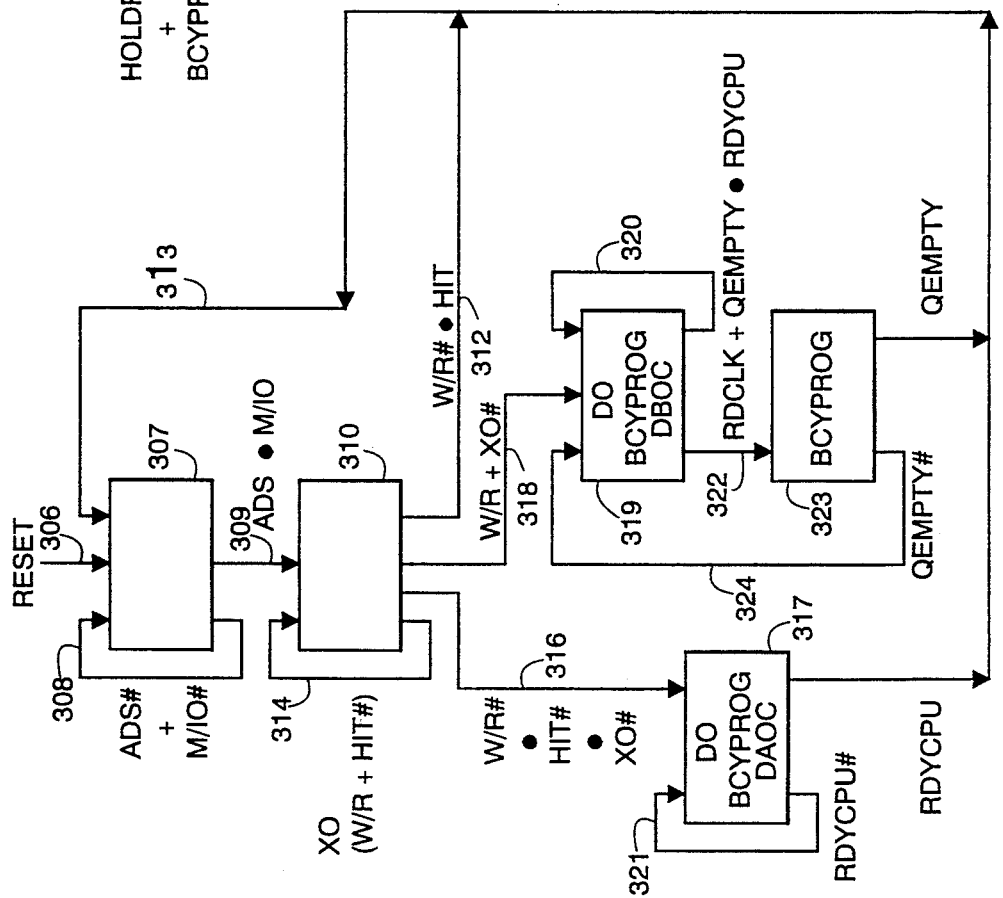
FIG. 10 is a state diagram showing diagrammatically the operation of a third portion of the control circuit of FIG. 1.

Turning now to FIG. 10, the illustrated state machine is forced at 306 by a system reset into an initial state 307. So long as the signals ADS and M/IO from the CPU 11 are not simultaneously activated, the state machine remains at 308 in state 307. When both ADS and M/IO are activated to indicate the start of a memory cycle, a transition is made at 309 to state 310. If the W/R and HIT signals indicate that a memory read is being performed and that the requisite data is duplicated in the cache RAM 13, then it is not necessary for any data to be read from the main memory 18 and a transition is therefore made at 312 and 313 to the initial state 307. Except in this particular situation, it will be necessary to access the main memory 18, and the state machine therefore checks an internal signal XO, which is generated by the state machine of FIG. 11 in a manner described below, and which in particular is activated if the system bus 17 is being controlled by another device. So long as another device is using the bus, the state machine remains in state 310 as shown at 314. Once the signal XO is deactivated to indicate that the bus is available, a transition is made at 316 to state 317 in the case of a memory read, or at 318 to state 319 in the case of a memory write.

In state 317, which corresponds to a memory read, the signal DAOC is generated to enable the tri-state buffer 81 in FIG. 2 so that the data being read from the main memory 18 can flow through the queue circuit 13 to the CPU 11. The signal DO is also generated on line 36 in FIG. 1, and as mentioned above serves as the equivalent for the bus 17 of the signal ADS on line 26 of bus 12. An internal signal BCYPROG is also generated to indicate that a bus cycle is in progress, and is used by the state machine of FIG. 11 in a manner described below. The state machine remains in state 317 as shown at 321 until the state machine of FIG. 8 generates the signal RDYCPU to indicate that the memory cycle is to be terminated, and then returns at 313 to the initial state 307. State 319 corresponds to a write cycle, and the state machine produces DO and BCYPROG the same as it did in state 317, but here the tri-state buffer signal generated is the signal DBOC which enables the tri-state buffer 76 of FIG. 2 so that data from the queue circuit 13 is transmitted across the system bus 17 to the main memory 18. Also, the state machine stays in state 319 at 320 until the signal RDCLK is generated to indicate completion of the transfer of a word from the queue circuit 14 to memory 18, or until signals QEMPTY and RDYCPU occur simultaneously to indicate the end of the transfer of a word directly from the CPU 11 to memory 18, at which point a transition is made at 322 to state 323. In state 323, the state machine checks the status of the signal QEMPTY. If the signal is not activated, then the queue circuit 14 is not yet empty, and the state machine returns at 324 to state 319 in order to transfer another word from the queue circuit 13 to the main memory 18. On the other hand, if the signal QEMPTY is activated to indicate that the queue circuit 13 is empty, the state machine returns at 313 to the initial state 307.

Figure 11:
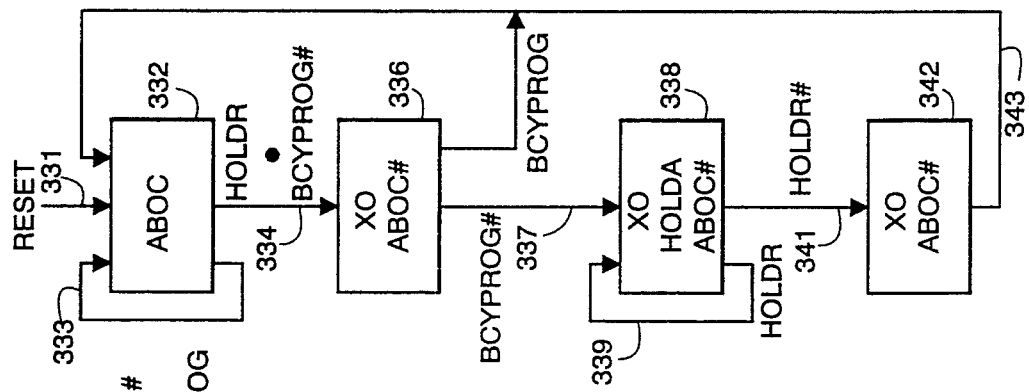
FIG. 11 is a state diagram showing diagrammatically the operation of a fourth portion of the control circuit of FIG. 1.

Turning to the state machine of FIG. 11, a system reset forces the state machine at 331 into an initial state 332. In this state, the signal ADOC is activated so that the buffer 77 of FIG. 2 is enabled and transmits address and control information onto lines of the system bus 17. The state machine will remain indefinitely in state 332 unless some other device requests control of the system bus 17 by activating the signal HOLDR shown in FIG. 1. In order to turn the system bus 17 over to another device, the state machine must wait until the signal BCYPROG controlled by the state machine of FIG. 10 is not activated to indicate that the bus is not in use. The state machine therefore remains in initial state 332 as shown at 333 so long as the signal HOLDR is not activated simultaneously with BCYPROG being deactivated. If and when HOLDR is activated and BCYPROG is not, the state machine proceeds at 334 to state 336, where it activates the internal signal XO to the state machine of FIG. 10 to indicate that the bus is being used by another device, and where it deactivates the signal ABOC in order to disable the tri-state buffer 77 of FIG. 2 so that the associated lines of system bus 17 can be controlled by the other device. The state machine checks the signal BCYPROG again to make sure it is still not active. If BCYPROG has been activated, the state machine returns at 343 to block 332. Otherwise, the state machine proceeds at 337 to state 338, where it continues to generate the signals ABOC and XO, and also generates the additional signal HOLDA, which tells the external device that it is now free to take control of and use the bus 17. So long as the external device keeps the signal HOLDR activated, the state machine remains in the state 338 as shown diagrammatically at 339. When the external device ultimately deactivates the signal HOLDR to indicate that it is done with the bus, the state machine proceeds at 341 to state 342, where it deactivates the signal HOLDA, but keeps the signal XO activated and the signal ABOC deactivated. The state machine then proceeds at 343 to the initial state 332, where the signal XO is deactivated and the signal ABOC is activated.

The preferred embodiment of the queue circuit described in detail above basically provides for three specific depths of the queue, namely a maximum of 16 words, a maximum of 1 word, or a maximum of no words (queue disabled). However, it will be recognized that other specific depths could easily be implemented, and that a single system could in fact provide for selection of the queue depth from a wider range of possible depths, for example any selected one of the depths 0, 1, 2, 3, 4, 5, 6, 7, 8, 9, 10, 11, 12, 13, 14, 15, or 16.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An apparatus comprising: first means for storing a plurality of data words; second means for outputting data words to be stored in said first means; and queue means cooperable with said first and second means and having a storage portion, said queue means having means for accepting and temporarily storing in said storage portion each said data word from said second means, and having means for transferring to said first means each said data word stored in said storage portion, said queue means including third means specifying a maximum number of data words which can be stored in said storage portion, and including control means cooperable with said third means for facilitating selective variation of said maximum number of words, said control means having means cooperable with said third means for setting said maximum number of words specified by said third means to a selected one of first and second values which are different; wherein said means for transferring includes means cooperable with said storage portion and said first means for minimizing the number of data words stored in said storage portion at any given point in time by effecting said transferring to said first means of each said data word in said storage portion as soon as possible after the data word is stored in said storage portion; wherein said storage portion includes a predetermined number of storage elements each capable of storing a respective data word, includes load pointer means for identifying a respective one of said storage elements into which the next data word from said second means is to be stored, and includes read pointer means for identifying a respective one of said storage elements containing the next data word to be transferred from said queue means to said first means; wherein each said pointer means includes a cyclic counter having a plurality of states equal in number to said predetermined number of storage elements, and includes decode means responsive to said cyclic counter for selecting in response to each of said states of said cyclic counter a respective one of said storage elements of said storage portion; and wherein said queue means includes a plurality of flip-flops which are equal in number to said storage elements and which are each associated with a respective one of said storage elements, means responsive to storage of a data word from said second means in a respective one of said storage elements for setting the corresponding flip-flop, means responsive to transfer of a data word from one of said storage elements to said first means for resetting the corresponding flip-flop, an AND gate having a plurality of inputs each coupled to an output of a respective one of said flip-flops, a NOR gate having a plurality of inputs each coupled to the output of a respective one of said flip-flops, two further flip-flops having clock inputs respectively clocked by a signal which effects the storage of a data word in one of said storage elements and a signal which effects transfer of a data word out of one of said storage elements, one of said further flip-flops having a data input coupled to an inverted data output of the other thereof and having a data output coupled to a data input of the other thereof, an exclusive NOR gate having two inputs each coupled to the data output of a respective one of said further flip-flops and having a data output, an inverter having a data input coupled to said data output of said exclusive NOR gate and having a data output, a first selector having two inputs respectively coupled to and output of said AND gate and said output of said inverter and having an output coupled to said control means for indicating whether said storage portion can accept a data word from said second means, a further selector having two inputs respectively coupled to and output of said NOR gate and said output of said exclusive NOR gate and having an output coupled to said control means for indicating whether said storage portion contains a data word awaiting transfer to said first means, and wherein said third means includes a register containing a value corresponding to said maximum number of data words and means responsive to said value in said register for causing each said selector to supply to said output thereof the signal present at a selected one of said inputs thereof.

2. An apparatus comprising: first means for storing a plurality of data words; second means for outputting data words to be stored in said first means; and queue means cooperable with said first and second means and having a storage portion, said queue means having means for accepting and temporarily storing in said storage portion each said data word from said second means, and having means for transferring to said first means each said data word stored in said storage portion, said queue means including third means specifying a maximum number of data words which can be stored in said storage portion, and including control means cooperable with said third means for facilitating selective variation of said maximum number of words, said control means having means cooperable with said third means for setting said maximum number of words specified by said third means to a selected one of first and second values, said first value being greater than said second value; wherein said means for transferring includes means cooperable with said storage portion and said first means for minimizing the number of data words stored in said storage portion at any given point in time by effecting said transferring to said first means of each said data word in said storage portion as soon as possible after the data word is stored in said storage portion; wherein said storage portion includes a plurality of storage elements each capable of storing a respective data word, a first set of said storage elements being equal in number to said first value and a second set of said storage elements being equal in number to said second value, includes load pointer means for identifying one of said storage elements from a respective one of said first and second sets into which the next data word from said second means is to be stored when said third means is respectively specifying said first and second values, and includes read pointer means for identifying one of said storage elements from a respective one of said first and second sets containing the next data word to be transferred from said queue means to said first means when said third means is respectively specifying said first and second values; means for producing a first signal when said storage elements of said first set each contain a stored data word, for producing a second signal when said storage elements of said second set each contain a stored data word, for producing a third signal when said storage elements of said first set are each free of stored data words, and for producing a fourth signal when said storage elements of said second set are each free of stored data words; a first selector having first and second inputs to which are respectively applied said first and second signals and having an output coupled to said control means for indicating whether said storage portion can accept a data word from said second means; a further selector having first and second inputs to which are respectively coupled said third and fourth signals and having an output coupled to said control means for indicating whether said storage portion contains a data word awaiting transfer to said first means; wherein said first and second selectors each respectively couple the first and second inputs thereof to the output thereof when said third means is respectively specifying said first and second values.

3. An apparatus as recited in claim 2, wherein said second value is two and said means for producing said second and fourth signals includes two flip-flops having clock inputs respectively clocked by a signal which effects the storage of a data word in one of said storage elements of said second set and a signal which effects transfer of a data word out of one of said storage elements of said second set, one of said flip-flops having a data input coupled to an inverted data output of the other thereof and having a data output coupled to a data input of the other thereof, an exclusive NOR gate having two inputs each coupled to the data output of a respective one of said flip-flops and having a data output at which said exclusive NOR gate produces said fourth signal, and an inverter having a data input coupled to said data output of said exclusive NOR gate and having a data output at which said inverter produces said second signal.

4. An apparatus as recited in claim 2, wherein said means for producing said first and third signals includes a plurality of flip-flops which are equal in number to said first value and which are each associated with a respective one of said storage elements of said first set, means responsive to storage of a data word from said second means in a respective one of said storage elements of said first set for setting the corresponding flip-flop, means responsive to transfer of a data word from one of said storage elements of said first set to said first means for resetting the corresponding flip-flop, an AND gate having a plurality of inputs each coupled to an output of a respective one of said flip-flops and having an output at which said AND gate produces said first signal, and a NOR gate having a plurality of inputs each coupled to the output of a respective one of said flip-flops and having an output at which said NOR gate produces said third signal.

5. An apparatus as recited in claim 2, wherein said storage elements of said second set are a subset of said storage elements of said first set.

6. An apparatus as recited in claim 2, wherein each said pointer means includes a cyclic counter having a plurality of states equal in number to one of said first and second values as currently specified by said third means and includes decode means responsive to said cyclic counter for selecting in response to each of said states of said cyclic counter a respective one of said storage elements of said first set when said third means is specifying said first value and a respective one of said storage elements of said second set when said third means is specifying said second value.

7. An apparatus as recited in claim 2, wherein said first means is randomly addressable and includes a plurality of storage locations which can each store a respective said data word and which are each assigned a respective unique address; wherein said second means outputs for each said data word a respective associated address which is the address of a respective one of said storage locations in said first means in which the associated data word is to be stored; wherein said queue means accepts and temporarily stores in said storage portion each said data word and associated address output by said second means, and subsequently transfers to said first means each said data word and associated address stored in said storage portion; and wherein said first means includes means responsive to each said data word and associated address provided to said first means by said queue means for using the address to address one of said storage locations while storing therein the associated data word.

8. An apparatus as recited in claim 7, wherein said second means outputs successive said data works which have associated therewith respective said addresses which are not successive contiguous storage locations in said first means.

9. An apparatus as recited in claim 2, wherein said second means outputs for each said data word associated control information, wherein said queue means stores in said storage portion with each said data word said address and control information associated therewith, and wherein said means responsive to said data words and associated addresses output to said first means by said queue means is responsive to said control information output therewith by said queue means for controlling the storage in said first means of each said data word.

10. An apparatus as recited in claim 2, further including a cache memory which is coupled to said processor and which has means for storing duplicates of the data words in a plurality of said storage locations in said first means.

11. An apparatus as recited in claim 2, wherein said first and second valves are each a different positive integer greater than zero.

12. An apparatus as recited in claim 2, wherein each said pointer means includes a cyclic counter having a plurality of states equal in number to said first value, and includes decode means responsive to said cyclic counter for selecting in response to each of said states of said cyclic counter a respective one of said storage elements of said first set.

* * * * *